(12) United States Patent
Fay

(10) Patent No.: US 8,495,852 B2
(45) Date of Patent: Jul. 30, 2013

(54) METHODS AND SYSTEMS FOR INSULATING A BUILDING

(75) Inventor: Ralph Michael Fay, Lakewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/286,569

(22) Filed: Nov. 1, 2011

(65) Prior Publication Data
US 2013/0104469 A1    May 2, 2013

(51) Int. Cl.
*E04B 1/00* (2006.01)

(52) U.S. Cl.
USPC ...................................... 52/745.13; 52/404.3

(58) Field of Classification Search
USPC ........... 52/480, 404.3, 742.13, 745.09, 794.1, 52/404.1, 745.13
See application file for complete search history.

(56) References Cited

U.S. PATENT DOCUMENTS

| | | | | | |
|---|---|---|---|---|---|
| 2,885,008 | A | * | 5/1959 | Hoffer | 166/136 |
| 2,989,790 | A | * | 6/1961 | Brown | 52/742.13 |
| 3,559,890 | A | * | 2/1971 | Brooks et al. | 239/304 |
| 3,611,653 | A | * | 10/1971 | Zinn | 52/241 |
| 3,619,437 | A | * | 11/1971 | McDonald, Jr. | 264/46.6 |
| 3,621,624 | A | * | 11/1971 | Gustafson | 52/91.1 |
| 3,633,795 | A | * | 1/1972 | Brooks | 222/134 |
| 3,641,724 | A | * | 2/1972 | Palmer | 52/793.11 |
| 3,785,913 | A | * | 1/1974 | Hallamore | 428/71 |
| 3,962,120 | A | * | 6/1976 | Chiocchio et al. | 422/133 |
| 4,004,387 | A | * | 1/1977 | Ellingson | 52/309.3 |
| 4,019,297 | A | * | 4/1977 | Murphy | 52/309.2 |
| 4,071,984 | A | * | 2/1978 | Larrow | 52/79.1 |
| 4,112,646 | A | * | 9/1978 | Clelland | 52/372 |
| 4,134,242 | A | * | 1/1979 | Musz et al. | 52/309.1 |
| 4,177,618 | A | * | 12/1979 | Felter | 52/742.13 |
| 4,204,977 | A | * | 5/1980 | Zwirlein | 422/133 |
| 4,259,028 | A | * | 3/1981 | Cook | 405/282 |
| 4,260,569 | A | * | 4/1981 | Hurst | 264/45.4 |
| 4,471,591 | A | * | 9/1984 | Jamison | 52/309.9 |
| 4,516,363 | A | * | 5/1985 | Beaulieu et al. | 52/92.1 |
| 4,671,032 | A | * | 6/1987 | Reynolds | 52/210 |
| 4,712,347 | A | * | 12/1987 | Sperber | 52/404.1 |
| 4,726,985 | A | * | 2/1988 | Fay et al. | 428/138 |
| 4,744,186 | A | * | 5/1988 | Smith et al. | 52/404.3 |
| 4,829,738 | A | * | 5/1989 | Moss | 52/742.13 |
| 4,839,222 | A | * | 6/1989 | Jain | 442/375 |
| 4,856,244 | A | * | 8/1989 | Clapp | 52/309.7 |
| 5,005,765 | A | * | 4/1991 | Kistner | 239/135 |
| 5,067,296 | A | * | 11/1991 | Brown et al. | 52/309.7 |
| 5,129,581 | A | * | 7/1992 | Braun et al. | 239/414 |
| 5,192,598 | A | * | 3/1993 | Forte et al. | 428/71 |
| 5,278,197 | A | * | 1/1994 | Jacobs et al. | 521/121 |
| 5,287,674 | A | * | 2/1994 | Sperber | 52/742.13 |

(Continued)

*Primary Examiner* — William Gilbert
*Assistant Examiner* — James Ference
(74) *Attorney, Agent, or Firm* — Robert D. Touslee

(57) ABSTRACT

Embodiments of the invention provide systems and methods for insulating a component of a home or building. An insulated component may include a generally planar surface and a frame positioned atop one side of the generally planar surface. The frame may include a plurality of outer studs coupled together to form an outer periphery and inner studs that divide the frame into one or more sections. One or more of the sections may include a cavity or hollow space. The insulated component may also include a first layer of insulation within one or more of the cavities. The first layer of insulation may include a pour insulation material that transitions from a liquid state or phase to a solid state or phase.

13 Claims, 6 Drawing Sheets

U.S. PATENT DOCUMENTS

| | | | |
|---|---|---|---|
| 5,297,369 A * | 3/1994 | Dickinson | 52/281 |
| 5,365,716 A * | 11/1994 | Munson | 52/742.13 |
| 5,389,167 A * | 2/1995 | Sperber | 156/71 |
| 5,526,957 A * | 6/1996 | Brown et al. | 222/94 |
| 5,638,651 A * | 6/1997 | Ford | 52/309.7 |
| 5,641,368 A * | 6/1997 | Romes et al. | 156/71 |
| 5,666,780 A * | 9/1997 | Romes et al. | 52/742.13 |
| 5,701,709 A * | 12/1997 | Dixon, III | 52/404.1 |
| 5,758,463 A * | 6/1998 | Mancini, Jr. | 52/309.12 |
| 5,765,330 A * | 6/1998 | Richard | 52/309.13 |
| 5,787,665 A * | 8/1998 | Carlin et al. | 52/309.4 |
| 5,842,276 A * | 12/1998 | Asher et al. | 29/897.32 |
| 5,921,055 A * | 7/1999 | Romes et al. | 52/742.13 |
| 5,953,883 A * | 9/1999 | Ojala | 52/794.1 |
| 6,012,263 A * | 1/2000 | Church et al. | 52/742.13 |
| 6,023,897 A * | 2/2000 | Leslie et al. | 52/292 |
| 6,026,629 A * | 2/2000 | Strickland et al. | 52/794.1 |
| 6,044,603 A * | 4/2000 | Bader | 52/309.7 |
| 6,085,479 A * | 7/2000 | Carver | 52/309.8 |
| 6,096,416 A * | 8/2000 | Altenberg | 428/317.7 |
| 6,205,729 B1 * | 3/2001 | Porter | 52/309.7 |
| 6,226,943 B1 * | 5/2001 | Grinshpun et al. | 52/309.4 |
| 6,279,284 B1 * | 8/2001 | Moras | 52/408 |
| 6,283,221 B2 * | 9/2001 | Hurray et al. | 169/30 |
| 6,308,491 B1 * | 10/2001 | Porter | 52/794.1 |
| 6,408,594 B1 * | 6/2002 | Porter | 52/794.1 |
| 6,481,172 B1 * | 11/2002 | Porter | 52/506.01 |
| 6,484,463 B1 * | 11/2002 | Fay | 52/404.4 |
| 6,533,189 B2 * | 3/2003 | Kott et al. | 239/8 |
| 6,551,951 B1 * | 4/2003 | Fay et al. | 442/82 |
| 6,557,313 B1 * | 5/2003 | Alderman | 52/407.3 |
| 6,695,224 B2 * | 2/2004 | Hunter | 239/290 |
| 6,715,241 B2 * | 4/2004 | Gelin et al. | 52/144 |
| 6,715,249 B2 * | 4/2004 | Rusek et al. | 52/481.1 |
| 6,758,305 B2 * | 7/2004 | Gelin et al. | 181/285 |
| 6,857,241 B1 * | 2/2005 | Pellicer | 52/583.1 |
| 7,127,856 B2 * | 10/2006 | Hagen et al. | 52/309.9 |
| 7,160,930 B2 | 1/2007 | Sparks et al. | |
| 7,168,216 B2 * | 1/2007 | Hagen, Jr. | 52/480 |
| 7,252,868 B2 * | 8/2007 | Suda et al. | 428/74 |
| 7,574,837 B2 * | 8/2009 | Hagen et al. | 52/404.1 |
| 7,662,221 B2 * | 2/2010 | Fay | 106/15.05 |
| 7,748,197 B2 | 7/2010 | Romes et al. | |
| 7,770,691 B2 | 8/2010 | Schabel, Jr. | |
| 2003/0061777 A1 | 4/2003 | Alderman | |
| 2004/0123539 A1 * | 7/2004 | Fay et al. | 52/407.3 |
| 2004/0182031 A1 * | 9/2004 | Fay et al. | 52/404.1 |
| 2004/0185204 A1 * | 9/2004 | Fay et al. | 428/36.9 |
| 2004/0185209 A1 * | 9/2004 | Fay et al. | 428/43 |
| 2004/0185210 A1 * | 9/2004 | Fay et al. | 428/43 |
| 2004/0185211 A1 * | 9/2004 | Fay et al. | 428/43 |
| 2004/0185212 A1 * | 9/2004 | Bogrett et al. | 428/43 |
| 2004/0185225 A1 * | 9/2004 | Fay et al. | 428/126 |
| 2004/0185226 A1 * | 9/2004 | Fay et al. | 428/138 |
| 2005/0153616 A1 * | 7/2005 | Suda et al. | 442/327 |
| 2005/0188649 A1 * | 9/2005 | Hagen | 52/782.1 |
| 2006/0192033 A1 * | 8/2006 | Dansizen et al. | 239/414 |
| 2006/0260267 A1 * | 11/2006 | Hagen et al. | 52/745.19 |
| 2006/0272280 A1 | 12/2006 | Romes et al. | |
| 2007/0227814 A1 | 10/2007 | Schabel, Jr. | |
| 2007/0234649 A1 | 10/2007 | Near et al. | |
| 2007/0290074 A9 * | 12/2007 | Dansizen et al. | 239/414 |
| 2008/0184650 A1 | 8/2008 | Fischer | |

* cited by examiner

2

METHODS AND SYSTEMS FOR INSULATING A BUILDING

BACKGROUND OF THE INVENTION

The present invention relates generally to methods and systems for insulating a component of a home or building, and more specifically to methods and systems for insulating a component of a home or building using a pour insulation material.

Factory built homes or prefabricated homes (e.g., manufactured home, modular homes, mobile homes, and the like) are quite often built with roof or attic designs that provides a limited amount of space. This space may be so limited that it may not be practical for an individual to climb into the attic and move around. As such, these attics often lack an access hatch that permits access to the attic from within the home. The roofs/attics are often built with limited space because the home and/or roof is often transported by road from a manufacturing facility to a job site where the home components are assembled to form the home. The designers are often constrained as to the height of the roof and/or home because the roof and/or home may be required to pass under one or more bridges, walkways, or overpasses, such as a freeway overpass. The height of the roof and/or home may be further constrained in other ways as well.

Such attics are often insulated using a loose fill insulation material that is often blown into the attic space. Because of the limited space within the attic, the amount of loose fill insulation that may be applied is limited, often to as little as 3 inches at the heel and 11 inches or less at the peak. This little insulation often provides an R value of approximately 30 or less, which provides moderate to inadequate insulation for the home and may result in fairly expensive heating and/or cooling bills, especially in extreme temperature conditions. Other components of factory built or prefabricated homes are also insulated, such as walls, floors, and the like and may suffer from similar problems.

Demand for factory built or prefabricated homes remains high. As such there remains a need for increasing the energy efficiency of prefabricated homes and improved methods of insulating components of factory built or prefabricated homes, especially for insulating space limited components, such as attics.

BRIEF SUMMARY OF THE INVENTION

Embodiments of the invention provide methods and systems for insulating a building, such as a component (e.g., attic, floor, wall, and the like) a prefabricated home. In one embodiment, a method of insulating a component of a building includes providing or obtaining a component of the building, such as an attic, floor, wall, and the like of a prefabricated home. The component may include a generally planar surface and a frame having a plurality of outer components coupled together to define an outer periphery and one or more inner components that divide the frame into one or more sections. The frame may be positioned atop one side of the generally planar surface so that at least one of the sections includes a cavity. The method may also include applying a pour insulation material within the cavity to insulate the component. The pour insulation material may transition from a liquid state to a solid state to form a first layer of insulation within the cavity. The first layer of insulation may have an insulation R value of between about 3.5 and about 7 per inch of insulation.

Applying the pour insulation material within the cavity may include positioning a nozzle over the cavity and injecting the pour insulation material within the cavity through the nozzle and/or nozzles. Applying the pour insulation material within the cavity may also include positioning an additional nozzle over an additional cavity and injecting pour insulation material within the additional cavity simultaneously with the pour insulation material being injected within the other cavity.

The generally planar surface may include a plurality of panels where adjacent panels abut each other at a seam. The method may further include sealing the seams prior to applying the pour insulation material. Sealing the seams may include applying a tape atop or over the seams. The method may additionally include applying a second layer of insulation atop the first layer of insulation. The second layer of insulation may include an insulation material that is different than the pour insulation material. In one embodiment, the second layer of insulation includes a loose fill fiber insulation material. In some embodiments, the first layer of insulation may be applied at a site where the component is manufactured or prefabricated and the second layer of insulation may be applied at a site where the component is installed to construct the building.

The second layer of insulation may be applied to a layer thickness of between about 1.5 inches and about 9 inches. The pour insulation material may adhesively couple the frame with the generally planar surface, thereby eliminating or reducing the need for other adhesives. For example, the pour insulation material may be applied within the cavity prior to the frame being adhesively coupled with the generally planar surface so that the pour insulation material adhesively couples the frame with the generally planar surface. The pour insulation material be a closed cell foam or an open cell foam. In some embodiments, the component being insulated may be a roof or attic having one or more truss members positioned atop the generally planar surface and the method further include applying the pour insulation material within the cavity while the one or more truss members are positioned atop the generally planar surface. The pour insulation material may have a low viscosity and slow cream time that allows the pour insulation material to spread out within the cavity in the liquid state so that the resulting first layer of insulation has a substantially equivalent layer thickness within the cavity.

In another embodiment, a component of a home or building may include a generally planar surface and a frame that may include a plurality of outer studs coupled together to define an outer periphery and one or more inner studs that divide the frame into one or more sections, where the frame is positioned atop one side of the generally planar surface so that at least one of the sections includes a cavity. The cavity may include a first layer of insulation having a substantially equivalent layer thickness throughout the cavity. The first layer of insulation may be a pour insulation material that transitions from a liquid state to a solid state and the first layer of insulation may have an insulation R value of between about 4 and about 7 per inch of insulation within the cavity.

In some embodiments, the component may include one or more structures of a home, such as a wall, a floor, an attic, and the like. In a specific embodiment, the structure comprises an attic or floor of a manufactured or modular home. The attic or roof may have a maximum height of between about 1 foot and about 4 feet. The cavity may also include a second layer of insulation positioned atop the first layer of insulation. The second layer of insulation may be an insulation material that is different than the pour insulation material, such as loose fill fiber insulation. The insulation R value of the combined first and second layers of insulation may be between about 40 and about 60. The pour insulation material may expand when the pour insulation material transitions from the liquid state to the solid state and the thickness of the first layer may be substantially equivalent to a height of one or more of the outer studs when the pour insulation material is in the solid state. In some embodiments, the layer thickness of the first layer of insulation may be between about 2 inches and about 5 inches.

In another embodiment, a system for applying pour insulation material to one or more cavities of a prefabricated component of a building or home may include a workstation that receives the prefabricated component to insulate the component. Such a prefabricated component may include a generally planar surface and a frame having a plurality of outer studs coupled together to define an outer periphery and one or more interior studs that divide the frame into one or more sections. The frame may be positioned atop one side of the generally planar surface so that at least one of the sections includes a cavity. The system may also include an injection mechanism having a plurality of nozzles positionable above one or more of the frame sections. The injection mechanism may be operable to inject a pour insulation material into one or more of the frame sections to a defined level so as to insulate the prefabricated component. The pour insulation material may transition from a liquid state to a solid state after an amount of time and the pour insulation material may have an insulation R value of between about 4 and about 7 per inch of insulation.

The system may further include a computing device communicatively coupled with the injection mechanism. The computing device may include a processor and a memory device having a set of instructions stored thereon. The instructions may be executed by the processor to cause the computing device to receive data associated with the prefabricated component, where the data includes dimensions for each of the plurality of sections, and transmit instructions to the injection mechanism to inject the pour insulation material within the frame section(s) to the defined level, where the amount of pour insulation material injected into the cavity is based on the dimensions of the section corresponding to the cavity.

BRIEF DESCRIPTION OF THE DRAWINGS

Embodiments of the present invention are described in conjunction with the appended figures.

Figure 1:
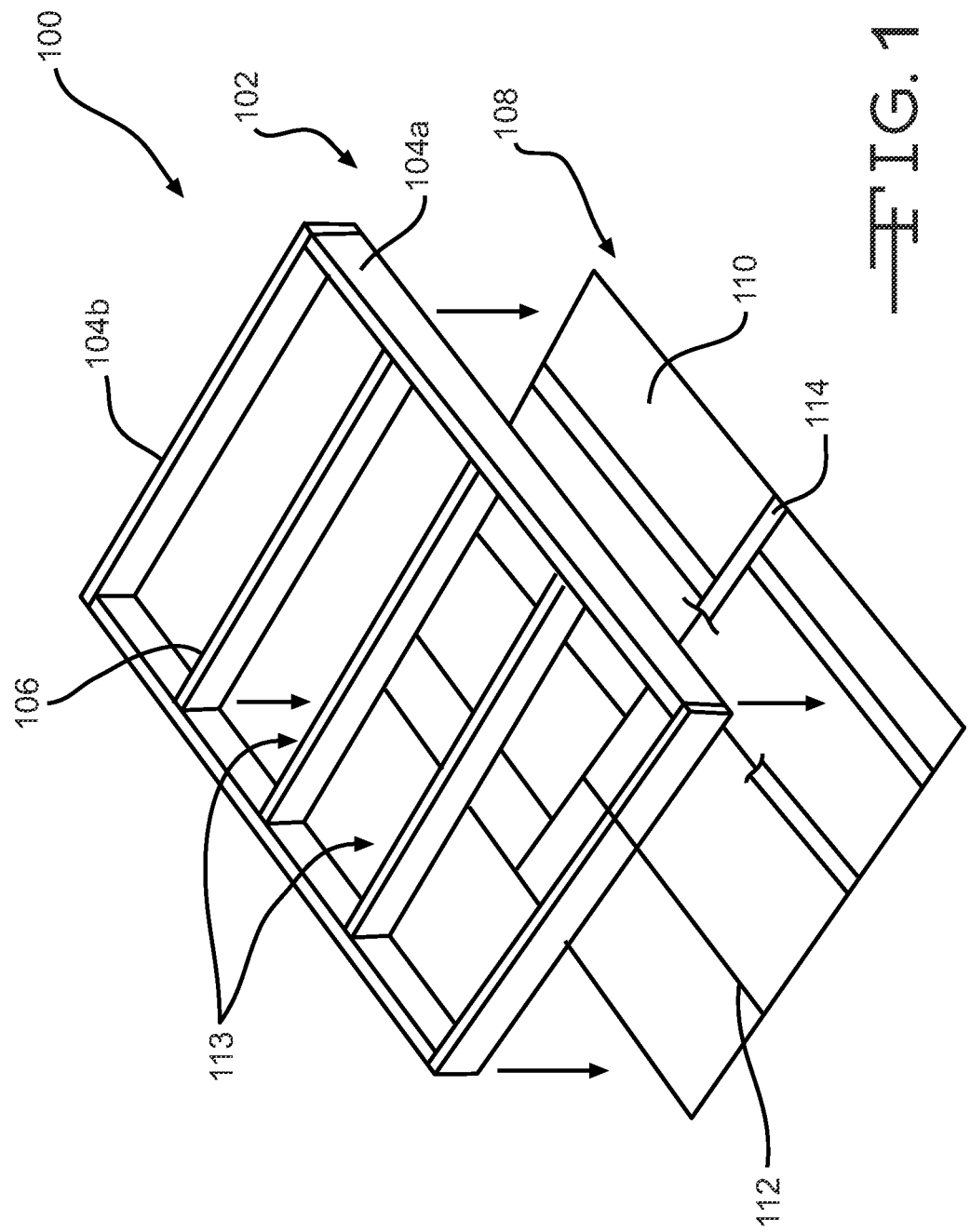
FIG. 1 illustrates an exploded view of a component of a home or building according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the embodiments will provide those skilled in the art with an enabling description for implementing one or more embodiments. It being understood that various changes may be made in the function and arrangement of elements without departing from the spirit and scope of the invention as set forth in the appended claims. Specific details are given in the following description to provide a thorough understanding of the embodiments. However, it will be understood by one of ordinary skill in the art that the embodiments may be practiced without these specific details. Also, it is noted that methods or processes may be depicted as a flowchart or a block diagram. Although a flowchart may describe the operations as a sequential process, many of the operations can be performed in parallel or concurrently. In addition, the order of the operations may be re-arranged. Further a process could have additional steps not discussed or included in a figure. Furthermore, not all operations in any particularly described process may occur in all embodiments.

As used herein, the term prefabricated building or home means any building that consists of one or more factory-built components or units. The prefabricated building or home may be assembled at the factory and shipped to a job site or assembled on-site to construct the building or home. For example, a prefabricated home may consist of several components that are built in a factory for assembly with other components, either at the factory or on-site, to construct the home. The components may include walls, floors, an attic or roof, and the like. Fabricating or building the walls, floors, roof, etc. may include installing plumbing, electrical, lighting, network connections, insulation, and the like in the walls, floors, roofs, etc. Specific examples of such prefabricated buildings are modules (modular homes), transportable section homes (manufactured homes), mobile homes, and the like, although the term may also refer to single components or panels that may be shipped to a job site and coupled with one or more other components or panels.

As used herein, the term insulation R value refers to thermal resistance, which quantifies the heat flux or amount of heat that is conducted through a material or a combination of materials, such as through a wall of a building or home. The higher the R value, the better a material or combination of materials resist thermal transfer. Thus, in building or home construction, building components having high R values (e.g., walls, ceilings, floors, windows, and the like) are desired.

Also, as used herein, the term pour insulation material means any type of insulating material that may be applied within a cavity or hollow area (e.g., poured, injected, inserted, and the like) in a fluid or semi-fluid phase or state. The pour insulation material may transition from the fluid or semi-fluid phase/state to a solid or semi-solid phase/state. In some embodiments, the pour insulation material may expand during the transition from the fluid/semi-fluid to the solid/semi-solid state. The pour insulation material may be a two component open or closed cell foam, such as for example a two component methylene diisocyanate (MDI) based polyurethane. In some embodiments, the first component of a two component foam comprises a polymeric isocyanate containing reactive isocyanate groups while the second component is a combination of polyols, catalytic agents, and/or a blowing agent such as HFC-245fa, HFC-365mfc, water, and the like. In some embodiments, the pour insulation may have an insulation R value of between about 3.5 and about 7.5 per inch of insulation material (in the solid/semi-solid phase), and in a specific embodiment may have an insulation R value of about 6. An example of such a pour insulation material is PRO-FORM™ 2.0 polyurethane pour foam-closed cell system manufactured by Bayer Material Science.

Figure 4A:
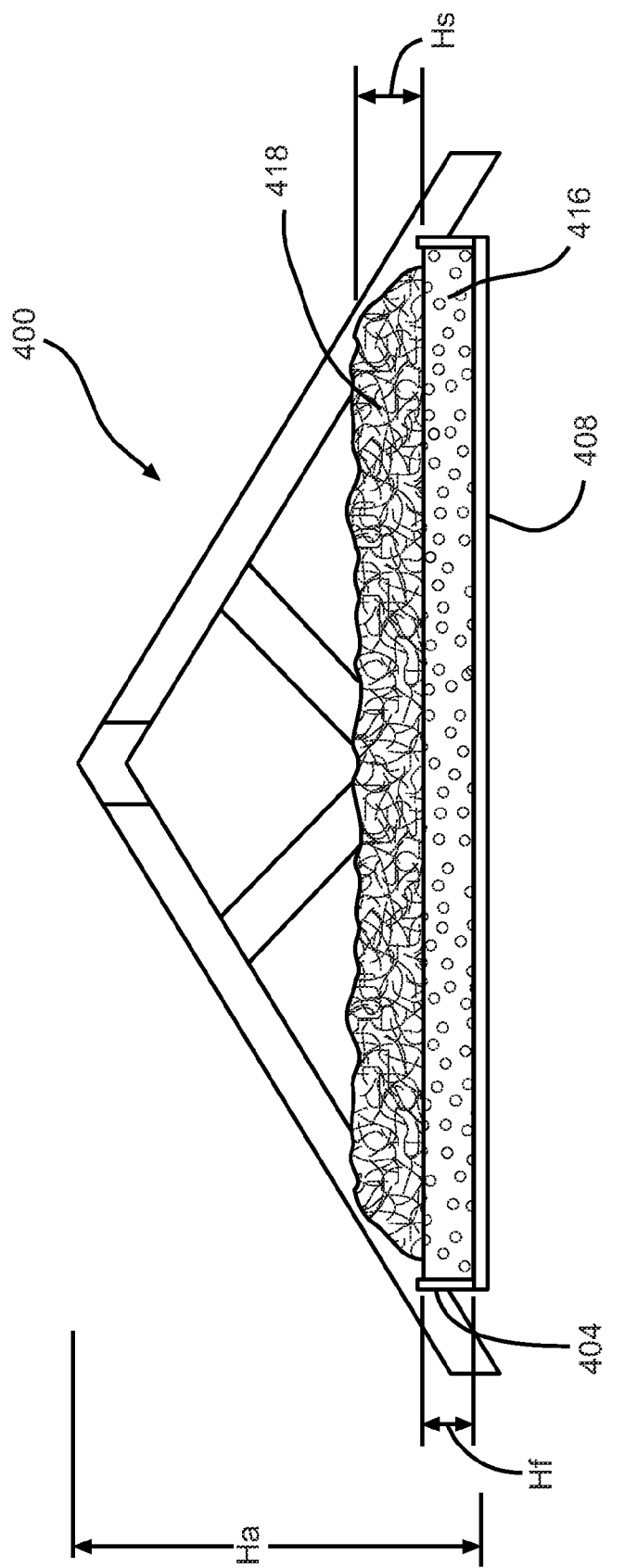
FIGS. 4A and 4B illustrate side views of components of a home or building having a portion of the component cutaway so as to show the component having one or more layers of insulation according to an embodiment of the invention.

Prefabricated home attics (or other components), typically are manufactured with a limited amount of space between the attic floor and the top of the roof (see attic height $H_a$ of FIG. 4A). The attic height $H_a$ typically ranges between about 12 inches and about 36 inches or more and is often constrained by various factors, such as clearance for bridges or overpasses during shipping from the manufacturer to the home construction site. The attic space may be so limited that it may not be practical for an individual to climb into the attic and move around. Some homes are built with cathedral or vaulted ceilings having an even more confined attic space, which may be as little as about 3.5 inches to about 7.0 inches at the heel and about 12 inches to about 20 inches at the peak (i.e., $H_a$ of FIG. 4B).

Due to the space limitations, insulating attics for prefabricated homes is often difficult. Further, the limited space limits the amount of insulation that may be applied within the attic, which may result in higher energy costs and/or an insufficient R value to meet or exceed current or future building insulation standards. The insulating methods and systems described herein that use a pour insulation material and/or hybrid insulation layer provide a convenient and easy way to insulate such space limited prefabricated home attics and components while providing improved R value for such attics or components when compared with traditional prefabricated homes.

Embodiments of the invention may also reduce or eliminate ice formation or ice damming issues common with prefabricated home attics or components. These problems often occur in prefabricated homes having loose fill insulation in the attic because the loose fill volume is limited at the attic heel, which is typically around 3.5 inches for a double wide or about 7 inches for a single wide home. The insulation R value at the heel is often as little as 10-16, which results in appreciable heat transfer near the heel that melts snow on the roof and results in ice damming or ice formation. Embodiments of the invention significantly enhance the insulation R value at the attic heel and thereby reduce or eliminate ice formation or ice damming issues.

Embodiments of the invention provide components of a home or building and method and systems for insulating a component of a home or building. The component may be an attic or roof, floor, wall, and the like and the home or building may be a prefabricated home, such as a manufactured home, modular home, mobile home, and the like. The component may include a generally planar surface and a frame positioned atop one side of the generally planar surface. The generally planar surface may include a plurality of panels where adjacent panels abut each other at a seam. The frame may include a plurality of outer studs that are coupled together to define a rectangular, square, or other shaped outer periphery and one or more inner studs that divide the frame into one or more sections. Some or all of the sections may define a cavity.

Some or all of the cavities may include a first layer of insulation. The first layer of insulation may have a substantially uniform thickness throughout the cavity and may include a pour insulation material that transitions from a liquid state or phase to a solid state or phase, the pour insulation material may have an insulation R value in the solid state or phase of between about 4 and about 7 per inch of insulation material. Some or all of the cavities may also include a second layer of insulation positioned atop the first layer. The second layer of insulation may include an insulation material different than the pour insulation material. For example, the second layer of insulation may include loose fill fiber insulation. The insulation R value of the combined first and second layers (i.e., the hybrid layer) may be between about 30 and about 60, and more commonly between about 40 and about 60.

The pour insulation material may expand as the material transitions from the liquid state or phase to the solid state or phase. The thickness of the first layer of insulation may be substantially equivalent to a height of one (or more)of the plurality of outer studs or inner studs when the pour insulation material is in the solid state or phase. In some embodiments, the layer thickness of the first layer of insulation may be between about 2 inches and about 5 inches (or more), and more commonly between about 3 and 4 inches. Similarly, in some embodiments, the layer thickness of the second layer of insulation may be between about 5 inches and about 12 inches (or more), and more commonly between about 7 and 10 inches. Having briefly described embodiments of the invention, additional aspects of the invention will be evident with reference to the figures.

FIG. 1 illustrates an exploded perspective view of a component 100 of a prefabricated home, such as a manufactured or modular home. Component 100 in FIG. 1 is a roof or attic of a prefabricated home, but may also be a floor, wall, and the like of the home. Component 100 includes a generally planar surface 108 and a frame 102 positioned atop one side of planar surface 108. Planar surface 108 includes a plurality of panels 110 that are positioned so that adjacent sides of the panels 110 abut at a seam 112. Some or all of the seams 112 may be sealed using an adhesive tape 114. Panels 110 may include gypsum boards (i.e., drywall), plywood, oriented strand boards (OSB), and/or other materials known in the building industry.

Frame 102 includes outer studs 104a and 104b that are coupled together to define an outer periphery of frame 102 and also includes one or more inner studs 106 that are coupled with the inner surface of opposing outer studs 104a. The inner studs 106 divide frame 102 into one or more sections 113. Opposing studs 104a may define a longitudinal length of frame 102 and opposing studs 104b may define a transverse length of frame 102, which may be shorter than the longitudinal length. When frame 102 is positioned atop planar surface 108, one or more of sections 113 may define a cavity or hollow space between opposing studs 106 and 104a and planar surface 108 (e.g., see cavity 314 of FIG. 3).

Frame 102 is positioned atop one side of planar surface 108 and may be coupled therewith. Coupling frame 102 and planar surface 108 may include adhesively bonding outer studs 104a and 104b and/or inner studs 106 with planar surface 108 and/or may include mechanically fastening (e.g., nails, screws, staples, and the like) studs 104a, 104b, and/or 106 with planar surface 108. In some embodiments, frame 102 is not adhesively coupled with planar surface 108 prior to insulating component 100 or is loosely coupled therewith using one or more screws, nails, and/or staples. In such embodiments the insulating material applied may adhesively couple frame 102 with planar surface 108.

Figure 2:
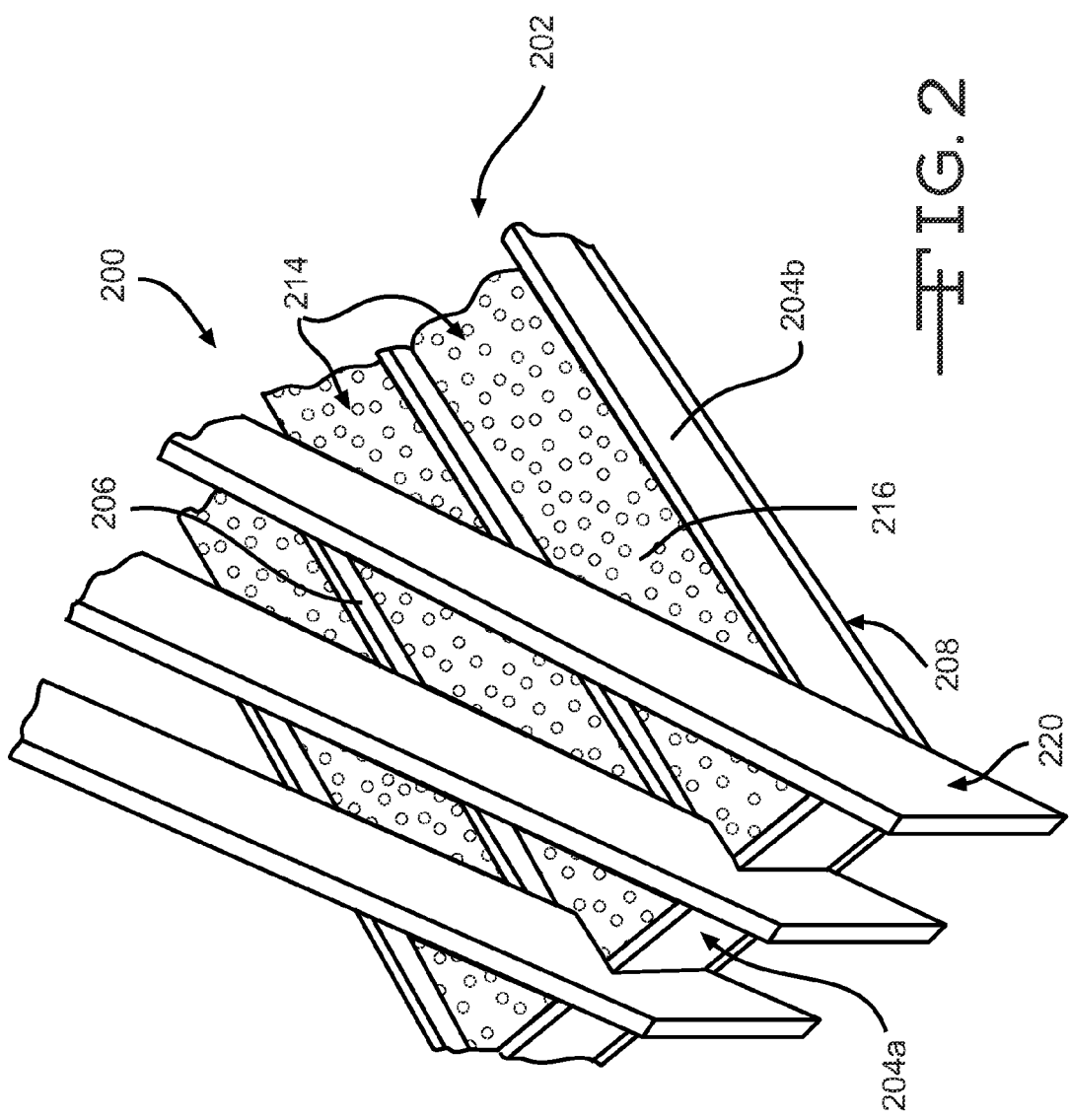
FIG. 2 illustrates a partial perspective view of a component of a home or building having one or more cavities insulated with a pour insulation material according to an embodiment of the invention.

Referring now to FIG. 2, illustrated is component 200 that includes a generally planar surface 208 and a frame 202 positioned atop planar surface 208 and coupled therewith. In FIG. 2, Component 200 depicts an attic of a prefabricated home, although in other embodiments component 200 could be a floor, a wall, and the like of the prefabricated home. Planar surface 208 includes a plurality of panels (not shown) that may be gypsum boards and the like. Frame 202 includes studs 204a, 204b, and 206, which in this embodiment represent components of a truss. For example, studs 204b and 206 represent bottom cords and studs 204a represent end blocks or the attic heel. Bottom cords 204b and 206 are coupled with top cords 220 via a gusset plate (not shown) or some other fastening means known in the art (e.g., mechanical fasteners, adhesive bonding, and the like). The truss may also include one or more web members (not shown) fastened to bottom cords 204b and 206 and top cords 220 that provide additional support.

Opposing end blocks 204a, opposing bottom cords 204b and 206, and planar surface 208 define a plurality of cavities 214 or hollow spaces, where each cavity 214 is bounded on the bottom by planar surface 208 and on the sides by end blocks 204a and bottom cords 206 and/or 204b. One or more of the cavities, and preferably all the cavities, are insulated with a pour insulation material 216. Pour insulation material 216 is a foam material that transition from a liquid state to a solid state. Pour insulation material 216 may be applied within cavities 214 by pouring or injection pour insulation material 216 in the liquid state directly onto a top surface of planar surface 208 within cavity 214. Preferably the seams (not shown) between adjacent panels (not shown) of planar surface 208 are adhesively taped to prevent pour insulation material 216 from leaking through the seams in the liquid state. A backer material (not shown) may be applied to the periphery of the frame 202 and planar surface 208 to prevent the pour insulation material 216 from leaking from the periphery of the structure. After pour insulation material 216 is applied, it foams and expands during the transition from the liquid state to the solid state. Pour insulation material 216 may be a two component open or closed cell foam, such as for example a two component methylene diisocyanate (MDI) based polyurethane. In some embodiments, pour insulation material 216 has an insulation R value in the solid state of between about 3 and about 8, and more commonly a value of about 6, per inch of insulation. An example of such a pour insulation material is PROFORM™ 2.0 polyurethane pour foam-closed cell system manufactured by Bayer Material Science.

In some embodiments, the amount of pour insulation material 216 that may be applied within a respective cavity 214 may be defined by the height of end block 204a, which may be between about 2 inches and about 6 inches, and more commonly about 3.5 inches. In essence four sides of the cavity are bounded by wood framing or other suitable material that retain the pour insulation in place as it is applied and the height of the sides create a maximum depth that the pour insulation can rise to. In some embodiments, pour insulation material 216 is applied so that the top surface of pour insulation material 216 in the solid state is substantially equivalent with the top surface of end block 204a. The insulation R value provided to component 200 by pour insulation material 216 may be varied by varying the amount of pour insulation material 216 applied. The thickness of the resulting foam insulation (i.e., the solid state of pour insulation material 216) may range from ½ inch that may provide air sealing to 5 inches or more to provide maximum insulation.

Pour insulation material 216 may adhesively bond planar surface 208 with bottom cords 206 and 204b and end blocks 204a, thereby replacing an adhesive bond material (e.g., polyurethane spray adhesive) and/or mechanical fasteners that would otherwise be applied in an additional manufacturing step. In other words, frame 202 (e.g., the individual truss components and end blocks) may be positioned atop planar surface 208 in an uncoupled or un-adhered state and pour insulation material 216 may be applied within cavities 214 to both insulate component 200 and adhesively bond frame 202 to planar surface 208. In other embodiments frame 202 is loosely or temporarily coupled with planar surface 208 using one or more mechanical fasteners or adhesive bonds that hold the structure in place. Pour insulation material 216 is then applied within cavities 214 to adhesively and permanently bond frame 202 to planar surface 208. Pour insulation material 216 may also be air impermeable to help air seal component 200 (e.g., gaps, seams, interfaces, and the like) and/or air seal any structures penetrating therethrough (e.g., lighting fixtures, plumbing, pipes, and the like).

Pour insulation material 216 may have a low viscosity in the liquid state and a slow cream and extended set time so that the liquid insulation material is able to spread out evenly within cavity 214 before it foams and sets up. In this manner, pour insulation material 216 may be self leveling. In some embodiments, pour insulation material 216 has a viscosity at a temperature of 77 degrees Fahrenheit of between about 750 and about 900. Similarly, in some embodiments, pour insulation material 216 has a cream time of between about 35 seconds and about 50 seconds, is tack free in a time of between about 260 seconds and about 300 seconds, and has a rise time (i.e., foam time) of between about 200 seconds and about 280 seconds. The pour insulation components may be heated to about 140° F. to reduce viscosity and speed up the reaction time. One advantage of using pour insulation material 216 is that is reduces and permits control of hazardous factory volatile organic compounds (VOC), which are common with high pressure, elevated temperature, two component spray polyurethane products. Because pour insulation material 216 is poured, injected, or otherwise applied within cavities 214 and not sprayed within the cavities, the VOCs emitted during application and curing are dramatically reduced and easily controlled with proper ventilation over and/or around component 200. This may reduce the need for ventilation in the factory and reduce or eliminate the need for workers immediately adjacent or around component 200 to wear full face or half mask respirators. Spray applications may cause droplets to form, which increases the chemical surface area exposed to the atmosphere and permits VOCs to readily offgas. The exposed surface area, along with heat, may dramatically impact VOC concentrations.

Figure 3:
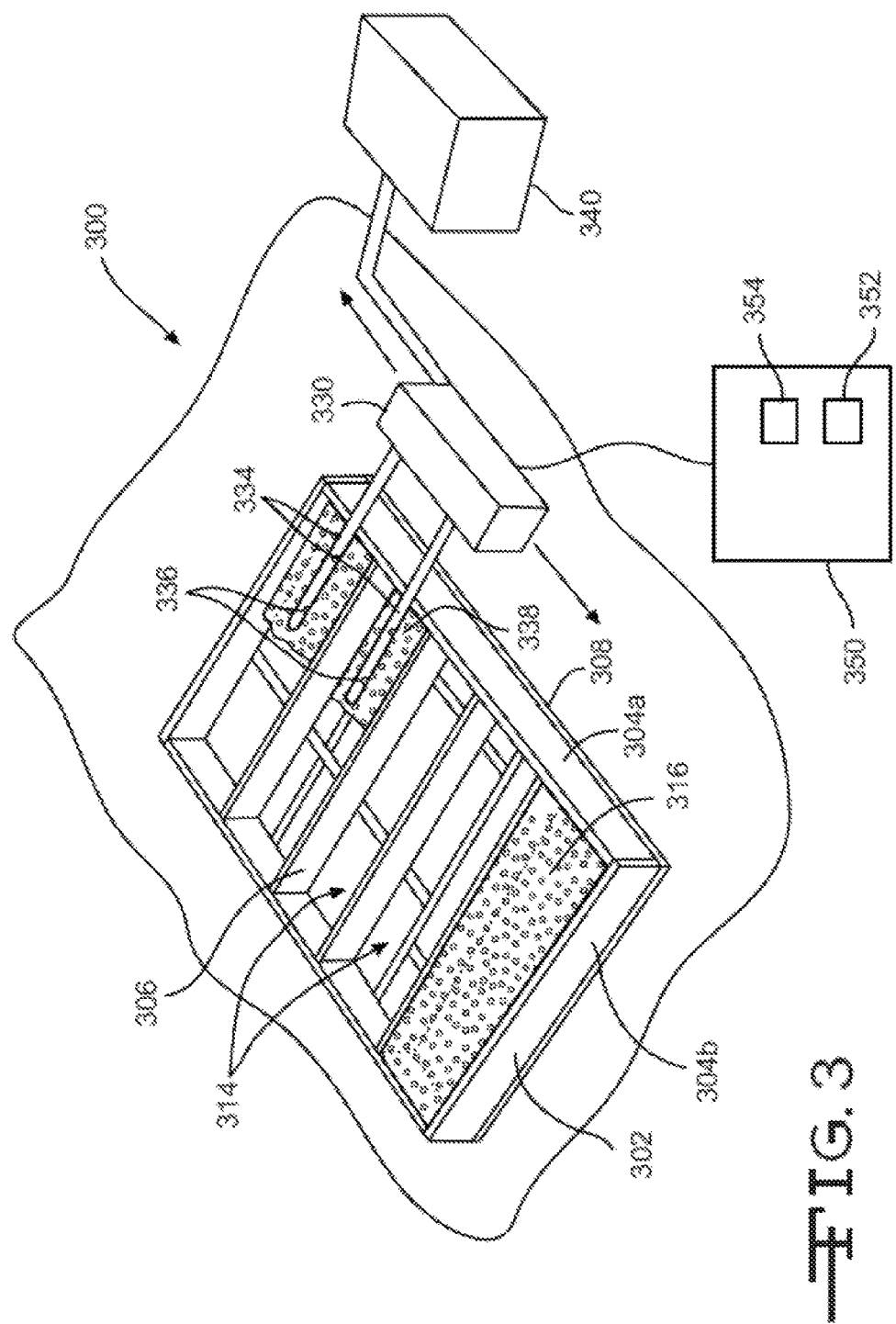
FIG. 3 illustrates a perspective view of a system for insulating a component of a home or building according to an embodiment of the invention.

Referring now to FIG. 3, illustrated is a system 300 for applying pour insulation material to one or more cavities 314 of a prefabricated component for a building or home. System 300 includes a workstation upon which a prefabricated component is positioned. As described above, the prefabricated component may include a generally planar surface 308 and a frame 302 positioned atop one side of planar surface 308. Frame 302 may include a plurality of studs 304a and 304b coupled together to define an outer periphery and include one or more inner studs 306 that divide frame 302 into sections or cavities 314.

System 300 also includes an injection mechanism 330 that is operable to inject, pour, or otherwise apply a liquid state pour insulation material 338 into one or more of the sections or cavities 314. Injection mechanism 330 may inject the liquid state pour insulation material 338 to a defined level or volume within a respective cavity 314 to insulate the prefabricated component. As described above, the liquid state pour insulation material 338 may transition from the liquid state to a solid state pour insulation material 316. FIG. 3 shows one of the cavities 314 having a solid state pour insulation material 316 within the cavity. The pour insulation material may foam or expand so that the top surface of the solid state pour insulation material 316 is roughly equal with the top surface of studs 304a and 304b.

Injection mechanism 330 may include one or more injection tube 334 that extend from a main body. The injection tubes 334 may each include one or more nozzles 336 positioned along a longitudinal length of the respective injection tube. The injection tubes 334 may be spaced apart so that each injection tubes and corresponding nozzle(s) is positioned above one of the cavities 314. The injection tubes 334 may simultaneously inject or pour the liquid state pour insulation material 338 within a respective cavity 314. The injection mechanism 330 may move along a longitudinal length of or otherwise traverse the prefabricated component so that the injection tubes 334 may inject liquid state pour insulation material 338 within each or most of the cavities 314. In some embodiments, injection tubes 334 traverse the entire width of the prefabricated component and are connected with a rail or another injection mechanism (not shown) on an opposite side of the prefabricated component. Additionally, in some embodiments, injection tubes 334 are individually controllable so that the liquid state pour insulation material 338 is delivered from only one injection tube or a combination of selected injections tubes (e.g., injected from end tubes and not intermediate tubes). Similarly, in some embodiments, nozzles 336 are individually controllable so that the liquid state pour insulation material 338 is delivered from selected or specified nozzles 336, such as only distal nozzles or a combination of distal, proximal, and intermediate nozzles on respective injection tubes. The individual controllability of injection tubes 334 and nozzles 336 allows injection mechanism 330 to accommodate prefabricated component having different designs (e.g., different cavity spacing, cavity patterns, and the like) and/or including unique features (e.g., attic access hatches, wall windows, pipes, vents, electrical components, and the like).

Injection mechanism 330 may be coupled via one or more hoses with a pour insulation material holding station 340, although in other embodiments injection mechanism 330 includes such features. Holding station 340 may mix the two component pour insulation material prior to delivering the pour insulation material to injection mechanism 330. In an exemplary embodiment, mixing of the two component pour insulation material is done at the pour head to eliminate chemical reaction and build up in the lines and hoses.

Similarly, injection mechanism 330 may be communicatively coupled with a computing device 350. Computing device 350 includes a processor 352 and a memory device 354. The memory device 354 may be programmed with the design and dimension details of the prefabricated component (e.g., cavity spacing and depth, access hatch or window locations, piping or other component locations, and the like) to automate injection of the pour insulation material within cavities 314 for specific and/or unique prefabricated components. Based on the design details of the prefabricated component, computing device 350 may cause injection mechanism 330 to inject the liquid state pour insulation material 338 to a predetermined level within each respective cavity so that the top surface of the solid state pour insulation material 316 (i.e., after expansion and/or foaming) is roughly equal with the top surface of studs 304a and 304b.

An advantage of system 300 is that it is operable with or easily integrated into pre-existing prefabricated component manufacturing processes, workstations, and equipment. Thus, system 300 may be easily implemented with minimal modification to pre-existing processes and equipment.

As used herein, the term "memory device" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processor(s) may be coupled with the memory device to perform the necessary tasks.

Referring now to FIG. 4A, illustrated is an exemplary embodiment of an insulated prefabricated component 400 having a hybrid insulation layer. Specifically, FIG. 4A illustrates a side view of a prefabricated component 400 having a front portion of the prefabricated component 400 removed to reveal the interior. Prefabricated component 400 represents an attic or roof of a manufactured, modular, or mobile home, although in other embodiments prefabricated component 400 may represent a wall, floor, and the like of a building or home. Attic or prefabricated component 400 has an attic height $H_a$ that may be space limited as described above. Likewise, prefabricated component 400 also includes a planar surface 408 and frame 404 as described above. A pour insulation material 416 is applied within the frame/planar surface cavity or hollow space as shown and as described above. The applied pour insulation material 416 forms a first insulation layer or foam insulation layer within prefabricated component 400. The foam insulation layer has a thickness $H_f$ such that a top surface of the foam insulation layer is roughly equal with or otherwise adjacent a top surface of frame 404. In some embodiments foam layer thickness $H_f$ is between about 2 and about 6 inches (or more), and more commonly between about 3 and 4 inches and roughly about 3.5 inches. The foam insulation layer may provide an insulation R value of between about 3 and about 7.5, and more commonly about 6, per inch of foam. In some embodiments, the overall insulation R value of the foam insulation layer may range between about 10 and about 30, and more commonly between about 15 and about 25.

Positioned atop the foam insulation layer is a second insulation layer 418. Second insulation layer 418 may include an insulation material different than the pour insulation material. For example, second insulation layer 418 may include a loose fill fiber insulation, which may include cellulose, fiber glass, and the like that is blown in over and atop the foam insulation layer. The loose fill insulation may be blown in to contact the underside of the roof, especially at the attic heel. In some embodiments, the loose fill insulation is blown against an attic ventilation system or vent or is blown in so as to maintain about 1 inch of air space under a roof deck board to allow for attic ventilation. In some embodiments, fiber insulation of 1.5 inches or greater is used to provide an ignition barrier over the foam insulation layer. Second insulation layer 418 has a layer thickness $H_s$ that may be between about 5 inches and about 15 inches, and more commonly between about 7 and about 10 inches. The loose fill fiber insulation may provide an R value of between about 3 and about 5 per inch of insulation material. Examples of such loose fill fiber insulation include Johns Manville Climate Pro® MH loose fill fiber insulation. In some embodiments, the overall insulation R value of the second insulation layer 418 may range between about 15 and about 45, and more commonly between about 25 and about 35. In some embodiments the second insulation layer 418 (e.g., the loose fill insulation) is applied at a job site where the prefabricated component is coupled with other prefabricated components to construct the home or building. Thus, in some embodiments, the foam insulation layer and loose fill insulation layer are each applied at different locations—the manufacturing site and construction site, respectively. In other embodiments, the foam insulation layer and second insulation layer are both applied at the same location.

The hybrid insulation layer (i.e., the combined first and second insulation layers that each include different insulating materials) may allow the spaced limited prefabricated component (e.g., attic, floor, wall, and the like) to have a higher R value than is otherwise possible using conventional insulating methods and materials, such as a single layer of blown in loose fill insulation. Further, the use of a first insulation layer including the pour insulation material may provide an appreciably higher R value than blown in loose fill insulation while reducing hazardous VOCs (compared to spray foam applications) and providing an easy method of applying the insulating material to the prefabricated component. The hybrid insulation layer may further reduce or minimize the heat transfer at the attic heel and thereby reduce or eliminate ice formation or ice damming. In some embodiments, the hybrid insulation layer provides an insulation R value of between about 40 and about 60. In a specific embodiment, the hybrid insulation layer provides an insulation R value of between about 45 and about 55. This R value is significantly greater than those achieved by current prefabricated components and is sufficient to exceed current and expected future insulation code requirements.

Figure 4B:
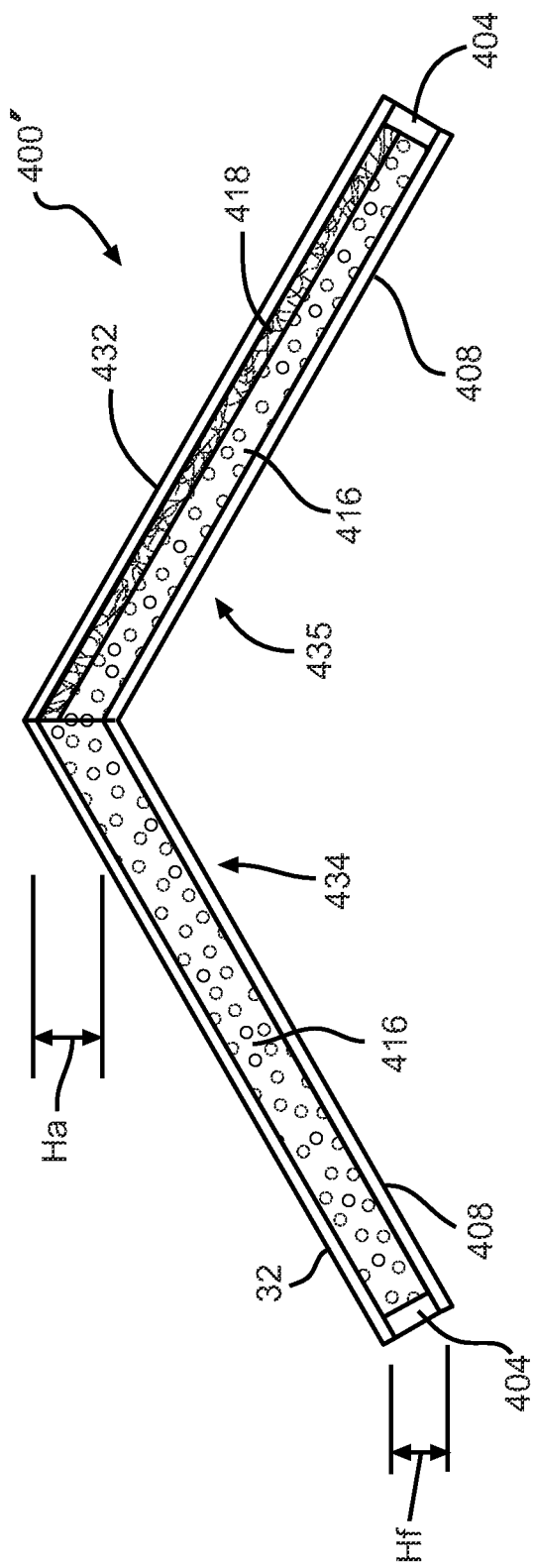

FIG. 4B illustrates a side view of an embodiment of vaulted or cathedral ceiling 400' having one or more layers of insulation. Vaulted ceiling 400' may represent an attic or roof of a manufactured, modular, or mobile home. Vaulted ceiling 400' has an attic height $H_a$ that is less than the attic height of component 400. Attic height $H_a$ may be as little as about 10 to 20 inches. Properly insulating vaulted ceiling 400' using conventional methods and systems may be difficult due to the limited space. Vaulted ceiling 400' includes a planar surface 408 and frame 404 as described above and also include a top surface 432, which may be roof sheathing, plywood, and the like. A pour insulation material 416 is applied within the frame/planar surface cavity or hollow space as described above to a thickness $H_f$. As shown on the left side of vaulted ceiling 400', thickness $H_f$ may be such that a top surface of the foam insulation layer is roughly equal with or otherwise adjacent a top surface of frame 404. As shown on the right side of vaulted ceiling 400', a second insulation layer 418 (e.g., loose fill fiber insulation) may be applied atop the pour insulation material 416 to provide a hybrid insulation layer as described above. As briefly mentioned above, a 1 inch air space between the top of the insulation layer and the underside of the roof sheathing 432 may be maintained to provide adequate attic ventilation. The pour insulation material layer and/or hybrid insulation layer may greatly enhance the R value of vaulted ceiling 400'.

Vaulted ceiling 400' may include two or more components, 434 and 435, that are each assembled on a planar horizontal surface and then lifted into position with respect to each other, and/or to the walls of a prefabricated home, and coupled together. The pour insulation material 416 may be applied within the cavities and allowed to cure prior to the components, 434 and 435, being lifted in place and coupled together.

Figure 5:
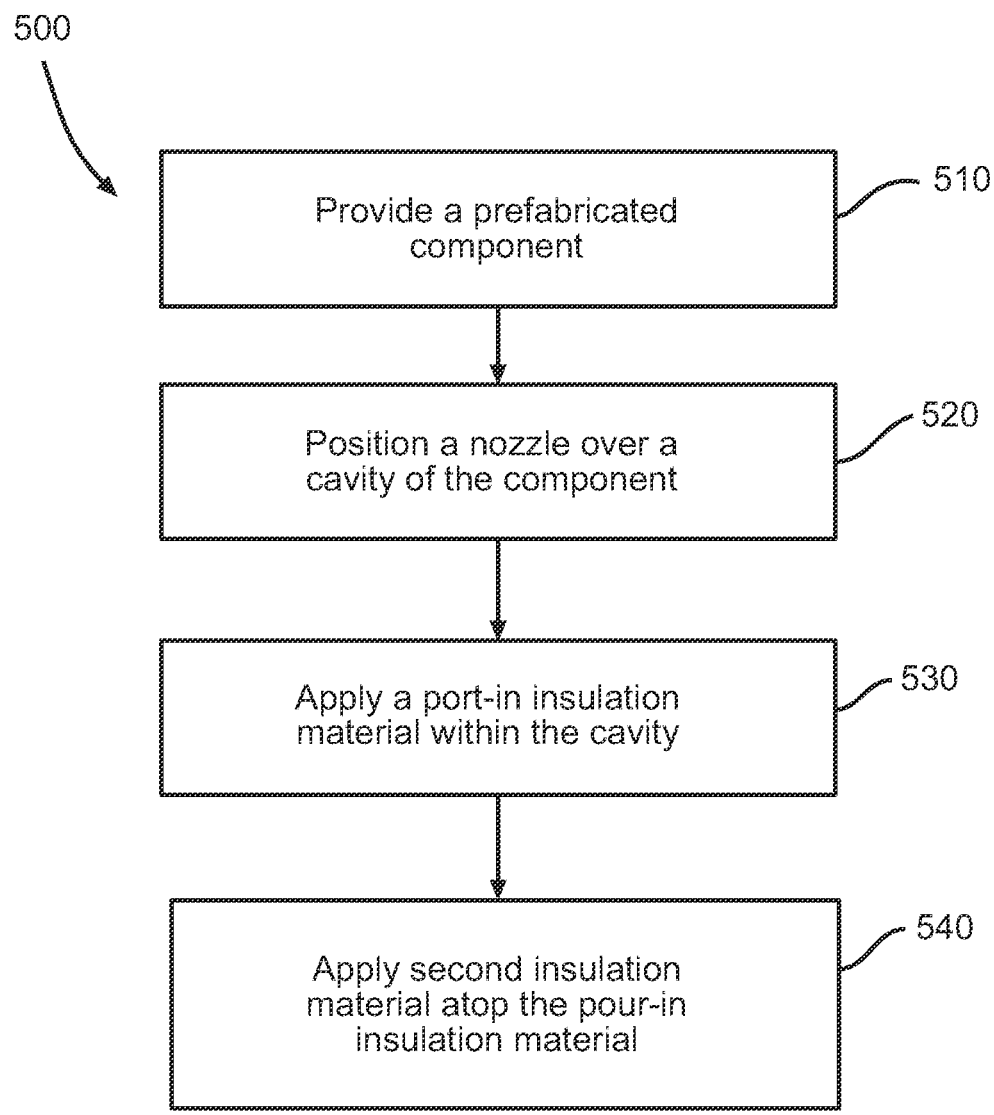
FIG. 5 illustrates a method of insulating a component of a home or building according to an embodiment of the invention.

Referring now to FIG. 5, illustrated is a method 500 of insulating a component of a building or home. At block 501, a prefabricated component of a home or building is provided or obtained. The prefabricated component may be an attic or roof, floor, wall, and the like including a generally planar surface and frame as described above. The prefabricated component may be a component of a manufactured home, modular home, mobile home, and the like. At block 520, a nozzle is positioned over a cavity of the component or a plurality of nozzles are positioned over respective cavities of the component. At block 530, a pour insulation material is injected, poured, or otherwise applied to or within the cavity of the component. In some embodiments, the pour insulation is applied using an injection mechanism that includes a plurality of nozzles where each nozzle is positioned over a respective cavity or where two over more nozzles are positioned over the same cavity. The injection mechanism may then inject the pour insulation material within the respective cavity. The component may be insulated at a workstation and the injection mechanism may be configured to traverse the workstation to injection the pour insulation material within each cavity.

The pour material may then be allowed an amount of time to foam, expand, and/or otherwise transition from a liquid or semi-liquid state/phase to a solid or semi-solid state/phase. At block 540, a second insulation material is applied atop the layer of pour insulation material to form a hybrid insulation layer. The second layer may include an insulation material different than the pour insulation. Applying the second insulation material may include blowing in loose fill fiber insulation material atop the layer of pour insulation. In some embodiments, the first layer of insulation is applied while the component is at a manufacturing site or facility and the second layer of insulation is applied at a job site where the component is being coupled with one or more other components to construct the building or home. In other embodiments, both the first and second layer are applied at the same site, which may be the manufacturing site or the job site. In some embodiments, the second layer of insulation is applied to a thickness of between about 5 and 15 inches, and more commonly between about 6 and 10 inches, while the first insulation layer is applied to have a thickness of between about 2 and 6 inches, and more commonly between about 3 and 4 inches.

Method 500 may further include sealing seams between adjacent panels of the planar surface to prevent or minimize leakage of the pour insulation material through the seams. Sealing the seams may include placing an adhesive tape over the seams. The pour insulation material may include a low viscosity and slow cream time that allows the pour insulation material to spread out within the cavity in the liquid state/phase so that the resulting first layer of insulation has a substantially equal or uniform layer thickness throughout the cavity. In some embodiments, pour insulation material 216 has a viscosity at a temperature of 77 degrees Fahrenheit of between about 750 and about 900. Similarly, in some embodiments, pour insulation material 216 has a cream time of between about 35 seconds and about 50 seconds. The pour insulation material 216, or the components thereof, may be heated to about 140° F. to reduce viscosity and speed up the reaction time. In embodiments where the prefabricated component is a roof or attic, the pour insulation material may be applied while the truss segments or members are coupled with the attic floor or may be applied prior to attaching the truss segments or members to the attic floor.

Method 500 may additionally include applying the pour insulation material within the cavity before the frame of the prefabricated component is adhesively coupled with the planar surface. In other words, the frame may not be coupled with the planar surface or may be loosely or temporarily coupled therewith via one or more mechanical fasteners (e.g., nails, screws, and the like) and/or adhesive bonds. In such embodiments, the pour material may be used to adhesively couple the frame and the planar surface in addition to insulating the component.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of insulating a component of a building comprising:
   providing a component of a building, the component comprising:
   a generally planar surface; and
   a frame comprising a plurality of outer components coupled together to define an outer periphery and one or more inner components that divide the frame into one or more sections, the frame being positioned atop one side of the generally planar surface so that at least one of the sections comprises a cavity;
   applying a pour insulation material within the cavity to insulate the component, the pour insulation material being applied within the cavity such that when expanded, a top surface of the pour insulation material is substantially equal with a top surface of the cavity, wherein the pour insulation material transitions from a liquid state to a solid state to form a first layer of insulation within the cavity, and wherein the first layer of insulation comprises an insulation R value of between about R-3.5 and about R-7 per inch of the insulation; and
   applying a second layer of loose fiber insulation atop the first layer of insulation.

2. The method of claim 1, wherein applying the pour insulation material comprises:
   positioning a nozzle over the cavity; and
   injecting the pour insulation material within the cavity through the nozzle.

3. The method of claim 2, further comprising:
   positioning an additional nozzle over an additional cavity; and
   injecting pour insulation material within the additional cavity simultaneously with the pour insulation material being injected within the cavity.

4. The method of claim 1, wherein:
   the generally planar surface comprises a plurality of panels;
   adjacent panels abut each other at a seam; and
   the method further comprises sealing the seams prior to applying the pour insulation material.

5. The method of claim 4, wherein sealing the seams comprises applying a tape atop the seams.

6. The method of claim 1, wherein the first layer of insulation is applied at a site where the component is manufactured and the second layer of insulation is applied at a site where the component is installed to construct the building.

7. The method of claim 1, further comprising applying the second layer of insulation to a layer thickness of between about 1.5 inches and about 9 inches.

8. The method of claim 1 wherein the pour insulation material adhesively couples the frame with the generally planar surface.

9. The method of claim 1, wherein pour insulation material comprises a closed cell foam.

10. The method of claim 1, wherein the pour insulation material comprises an open cell foam.

11. The method of claim 1, further comprising applying the pour insulation material within the cavity prior to the frame being adhesively coupled with the generally planar surface, wherein the pour insulation material adhesively couples the frame with the generally planar surface.

12. The method of claim 1, wherein the component comprises a roof or attic having one or more truss members positioned atop the generally planar surface, and wherein the method further comprises:
   applying the pour insulation material within the cavity while the one or more truss members are positioned atop the generally planar surface.

13. The method of claim 1, wherein the pour insulation material comprises a low viscosity and slow cream time that allows the pour insulation material to spread out within the cavity in the liquid state so that the resulting first layer of insulation has a substantially equivalent layer thickness within the cavity.

* * * * *